(12) United States Patent
Wright et al.

(10) Patent No.: US 12,288,042 B2
(45) Date of Patent: Apr. 29, 2025

(54) COMPUTER IMPLEMENTED METHOD AND SYSTEM FOR PSEUDO-RANDOM DATA GENERATOR

(71) Applicant: nChain Licensing AG, Zug (CH)

(72) Inventors: Craig Steven Wright, Cardiff (GB); Jack Owen Davies, Cardiff (GB)

(73) Assignee: nChain Licensing AG, Zug (CH)

( * ) Notice: Subject to any disclaimer, the term of this patent is extended or adjusted under 35 U.S.C. 154(b) by 880 days.

(21) Appl. No.: 17/429,734

(22) PCT Filed: Jan. 27, 2020

(86) PCT No.: PCT/IB2020/050599
§ 371 (c)(1),
(2) Date: Aug. 10, 2021

(87) PCT Pub. No.: WO2020/165669
PCT Pub. Date: Aug. 20, 2020

(65) Prior Publication Data
US 2022/0129249 A1    Apr. 28, 2022

(30) Foreign Application Priority Data
Feb. 11, 2019    (GB) .................................... 1901893

(51) Int. Cl.
*G06F 7/58*    (2006.01)
(52) U.S. Cl.
CPC .................................. *G06F 7/582* (2013.01)

(58) Field of Classification Search
CPC ... G07F 17/3241; G06Q 50/34; H04L 9/0662; H04L 9/0618–0637; H04L 9/32;
(Continued)

(56) References Cited

U.S. PATENT DOCUMENTS

| 5,778,069 A | 7/1998 | Thomlinson et al. |
| 2004/0141611 A1 | 7/2004 | Szrek et al. |

(Continued)

FOREIGN PATENT DOCUMENTS

| JP | 2002215030 A | 7/2002 |
| JP | 2003076272 A | 3/2003 |
| JP | 2008529042 A | 7/2008 |

OTHER PUBLICATIONS

GB Application No. 1901893.6 Examination Opinion dated Aug. 12, 2019.
(Continued)

*Primary Examiner* — Emily E Larocque
(74) *Attorney, Agent, or Firm* — Messner Reeves LLP

(57) ABSTRACT

A method of pseudo-randomly generating data is disclosed. The method Comprises receiving first data items ($s_1'$ $s_2'$ . . . $s_N'$) from a plurality of first participants and combining the first data items to generate second data ($\Sigma_i s_i'$). A one-way function is applied to the second data to generate third data ($\Sigma_i s_i'$), wherein the one-way function is adapted to receive input data and generate output data based on the input data, wherein the input data is not deducible from the output data and the one-way function.

18 Claims, 4 Drawing Sheets

Table 2: Script to spend funds encumbered by the Oracle transaction

| | | | |
|---|---|---|---|
| Empty | Empty | $\langle Sig\ P_W \rangle$ OP_TOALTSTACK $\langle P_1 \rangle$ $\langle P_2 \rangle$ ... $\langle P_N \rangle$ $\langle R_N \rangle$ OP_ROLL OP_TOALTSTACK OP_DROP ... OP_DROP OP_FROMALTSTACK OP_FROMALSTACK OP_SWAP OP_CHECKSIG | |
| | $\langle Sig\ P_W \rangle$ | OP_TOALTSTACK $\langle P_1 \rangle$ $\langle P_2 \rangle$ ... $\langle P_N \rangle$ OP_ROLL OP_TOALTSTACK OP_DROP ... OP_DROP OP_FROMALTSTACK OP_FROMALSTACK OP_SWAP OP_CHECKSIG | Constants are added to the stack |
| $\langle Sig\ P_W \rangle$ | $\langle P_1 \rangle$ $\langle P_2 \rangle$ ... $\langle P_N \rangle$ $\langle R_N \rangle$ | OP_ROLL OP_TOALTSTACK OP_DROP ... OP_DROP OP_FROMALTSTACK OP_FROMALSTACK OP_SWAP OP_CHECKSIG | Winning signature (WSG) moved to altstack |
| $\langle Sig\ P_W \rangle$ | $\langle P_1 \rangle$ ... $\langle P_N \rangle$ $\langle P_W \rangle$ | OP_TOALTSTACK OP_DROP ... OP_DROP OP_FROMALTSTACK OP_FROMALSTACK OP_SWAP OP_CHECKSIG | Winning public key (WPK) moved to top of stack |
| $\langle Sig\ P_W \rangle$ $\langle P_W \rangle$ | $\langle P_1 \rangle$ ... $\langle P_N \rangle$ | OP_DROP ... OP_DROP OP_FROMALTSTACK OP_FROMALSTACK OP_SWAP OP_CHECKSIG | WPK moved to altstack |
| $\langle Sig\ P_W \rangle$ $\langle P_W \rangle$ | Empty | OP_FROMALTSTACK OP_FROMALSTACK OP_SWAP OP_CHECKSIG | Remaining N-1 public keys dropped from stack |
| $\langle Sig\ P_W \rangle$ | $\langle P_W \rangle$ | OP_FROMALSTACK OP_SWAP OP_CHECKSIG | WPK moved back to stack |
| Empty | $\langle P_W \rangle$ $\langle Sig\ P_W \rangle$ | OP_SWAP | WSG moved back to stack |
| | $\langle Sig\ P_W \rangle$ $\langle P_W \rangle$ | OP_CHECKSIG | Winning signature checked |
| | TRUE | empty | |

(58) Field of Classification Search
CPC ..... H04L 9/321; H04L 9/3239; H04L 9/3247; H04L 9/50; G06F 7/58; G06F 7/582
See application file for complete search history.

(56) References Cited

U.S. PATENT DOCUMENTS

2018/0247191 A1* 8/2018 Katz ...................... G06F 21/53
2020/0152005 A1* 5/2020 Higgins .............. G07F 17/3244

OTHER PUBLICATIONS

Zhou et al., True random number generator based on mouse movement and chaotic hash function, Information Sciences 179, 2009, pp. 3442-3450, Elsevier Inc., China.
Ehara et al., How to generate transparent random number using blockchain, ISITA, 2018, pp. 169-173, IEICE, Singapore.

* cited by examiner

Figure 1

| Table 1: Script to generate random number $<R_N>$ ||| 
| --- | --- | --- |
| Empty | $<s_1'> <s_2'> ... <s_N'>$ OP_ADD OP_ADD ... OP_ADD OP_HASH256 $<N>$ OP_MOD | |
| $<s_1'> <s_2'> ... <s_N'>$ | OP_ADD OP_ADD ... OP_ADD OP_HASH256 $<N>$ OP_MOD | Constants are added to the stack |
| $<s_1'> <s_2'> ... <s_{N-1}' + s_N'>$ | OP_ADD ... OP_ADD OP_HASH256 $<N>$ OP_MOD | Top two values on stack added |
| $<s_1'> <s_2'> ... <s_{N-2}' + s_{N-1}' + s_N'>$ | ... OP_ADD OP_HASH256 $<N>$ OP_MOD | Top two values on stack added |
| $<\sum_i s_i'>$ | OP_HASH256 $<N>$ OP_MOD | Repeated addition of top two values |
| $<H(\sum_i s_i')>$ | $<N>$ OP_MOD | Top value hashed twice with SHA-256 |
| $<H(\sum_i s_i')> <N>$ | OP_MOD | Constants are added to the stack |
| $<R_N>$ | Empty | Remainder of 2$^{nd}$ value divided by 1$^{st}$ value computed; a random number |

Figure 2

| Initiation transaction |||
| --- | --- | --- |
| Number of inputs | | $N$ |
| Input 1 (unlocking) | Value | $x$ |
| | Signature script [P2PKH] | $<Sig\ P_1> <P_1> <r_1'>$ OP_DROP |
| Input 2 (unlocking) | Value | $x$ |
| | Signature script [P2PKH] | $<Sig\ P_2> <P_2> <r_2'>$ OP_DROP |
| | | . . . |
| Input $N$ (unlocking) | Value | $x$ |
| | Signature script [P2PKH] | $<Sig\ P_N> <P_N> <r_N'>$ OP_DROP |
| Number of outputs | | 1 |
| Output (locking) | Value | $N \times x$ |
| | Public key script [P2PKH] | OP_DUP OP_HASH160 $<Hash160(P_0)>$ OP_EQUALVERIFY OP_CHECKSIG |

| Oracle transaction | | |
|---|---|---|
| Number of inputs | | 1 |
| Input (unlocking) | Value | $N \times x$ |
| | Signature script [P2PKH] | $<Sig\ P_0>\ <P_0>$ |
| Number of outputs | | 1 |
| Output (locking) | Value | $N \times x$ |
| | Public key script [P2PKH] | $<P_1>\ <P_2>\ ...\ <P_N>\ <R_N>$ OP_ROLL OP_TOALTSTACK OP_DROP ... OP_DROP OP_FROMALTSTACK<br><br>OP_CHECKSIG |

Figure 3

| Oracle transaction (with house) | | |
|---|---|---|
| Number of inputs | | 1 |
| Input (unlocking) | Value | $(N \times x) + r$ |
| | Signature script [P2PKH] | $<Sig\ P_0>\ <P_0>$ |
| Number of outputs | | 1 |
| Output (locking) | Value | $(N \times x) + r$ |
| | Public key script [P2PKH] | $<P_1>\ <P_2>\ ...\ <P_N>\ <R_N>$ OP_ROLL OP_TOALTSTACK OP_DROP ... OP_DROP OP_FROMALTSTACK<br><br>OP_CHECKSIG<br><br>OP_IF<br>    OP_1<br>OP_ELSE<br>    $<\Delta T_E>$ OP_CHECKSEQUENCEVERIFY OP_DROP<br>    $<P_H>$ OP_CHECKSIG<br>OP_ENDIF |

Figure 4

| Winnings-redemption transaction | | |
|---|---|---|
| Number of inputs | | 1 |
| Input (unlocking) | Value | $N \times x$ |
| | Signature script [P2PKH] | $<Sig\ P_W>$ |
| Number of outputs | | 1 |
| Output (locking) | Value | $N \times x$ |
| | Public key script [P2PKH] | OP_DUP OP_HASH160 $<Hash160(P_W)>$ OP_EQUALVERIFY OP_CHECKSIG |

Figure 5

| Table 2: Script to spend funds encumbered by the Oracle transaction | | | |
|---|---|---|---|
| Altstack | Stack | Script | Description |
| Empty | Empty | $<Sig\ P_W>$ OP_TOALTSTACK $<P_1>$ $<P_2>$ ... $<P_N>$ $<R_N>$ OP_ROLL OP_TOALTSTACK OP_DROP ... OP_DROP OP_FROMALTSTACK OP_FROMALTSTACK OP_SWAP OP_CHECKSIG | |
| | $<Sig\ P_W>$ | OP_TOALTSTACK $<P_1>$ $<P_2>$ ... $<P_N>$ $<R_N>$ OP_ROLL OP_TOALTSTACK OP_DROP ... OP_DROP OP_FROMALTSTACK OP_FROMALTSTACK OP_SWAP OP_CHECKSIG | Constants are added to the stack |
| $<Sig\ P_W>$ | $<P_1>$ $<P_2>$ ... $<P_N>$ $<R_N>$ | OP_ROLL OP_TOALTSTACK OP_DROP ... OP_DROP OP_FROMALTSTACK OP_FROMALTSTACK OP_SWAP OP_CHECKSIG | Winning signature (WSG) moved to altstack |
| $<Sig\ P_W>$ | $<P_1>$ ... $<P_N>$ $<P_W>$ | OP_TOALTSTACK OP_DROP ... OP_DROP OP_FROMALTSTACK OP_FROMALTSTACK OP_SWAP OP_CHECKSIG | Winning public key (WPK) moved to top of stack |
| $<Sig\ P_W>$ $<P_W>$ | $<P_1>$ ... $<P_N>$ | OP_DROP ... OP_DROP OP_FROMALTSTACK OP_FROMALTSTACK OP_SWAP OP_CHECKSIG | WPK moved to altstack |
| $<Sig\ P_W>$ $<P_W>$ | Empty | OP_FROMALTSTACK OP_FROMALTSTACK OP_SWAP OP_CHECKSIG | Remaining N-1 public keys dropped from stack |
| $<Sig\ P_W>$ | $<P_W>$ | OP_FROMALTSTACK OP_SWAP OP_CHECKSIG | WPK moved back to stack |
| Empty | $<P_W>$ $<Sig\ P_W>$ | OP_SWAP | WSG moved back to stack |
| | $<Sig\ P_W>$ $<P_W>$ | OP_CHECKSIG | Winning signature checked |
| | TRUE | empty | |

Figure 6

COMPUTER IMPLEMENTED METHOD AND SYSTEM FOR PSEUDO-RANDOM DATA GENERATOR

CROSS-REFERENCE TO RELATED APPLICATIONS

This application is the U.S. National Stage of International Application No. PCT/IB2020/050599 filed on Jan. 27, 2020, which claims the benefit of United Kingdom Patent Application No. 1901893.6, filed on Feb. 11, 2019, the contents of which are incorporated herein by reference in their entireties.

FIELD OF THE INVENTION

The disclosure relates generally to pseudo-random data generation, and more particularly to pseudo-random number generation. The disclosure is suited, but not limited to, use in pseudo-random number generation for blockchain transactions.

BRIEF DESCRIPTION OF THE FIGURES

FIG. 1 is a Bitcoin script for pseudo-randomly generating a number using a method embodying the present disclosure;

FIG. 2 is an initiation transaction of a blockchain lottery embodying the present disclosure;

FIG. 3 is an oracle transaction of a blockchain lottery embodying the present disclosure;

FIG. 4 is an oracle transaction of a blockchain lottery of a further embodiment of the present disclosure;

FIG. 5 is a winnings-redemption transaction of a blockchain lottery embodying the present disclosure;

FIG. 6 is a Bitcoin script for redeeming the funds encumbered by the oracle transaction of FIG. 4.

DETAILED DESCRIPTION

Figure 7:
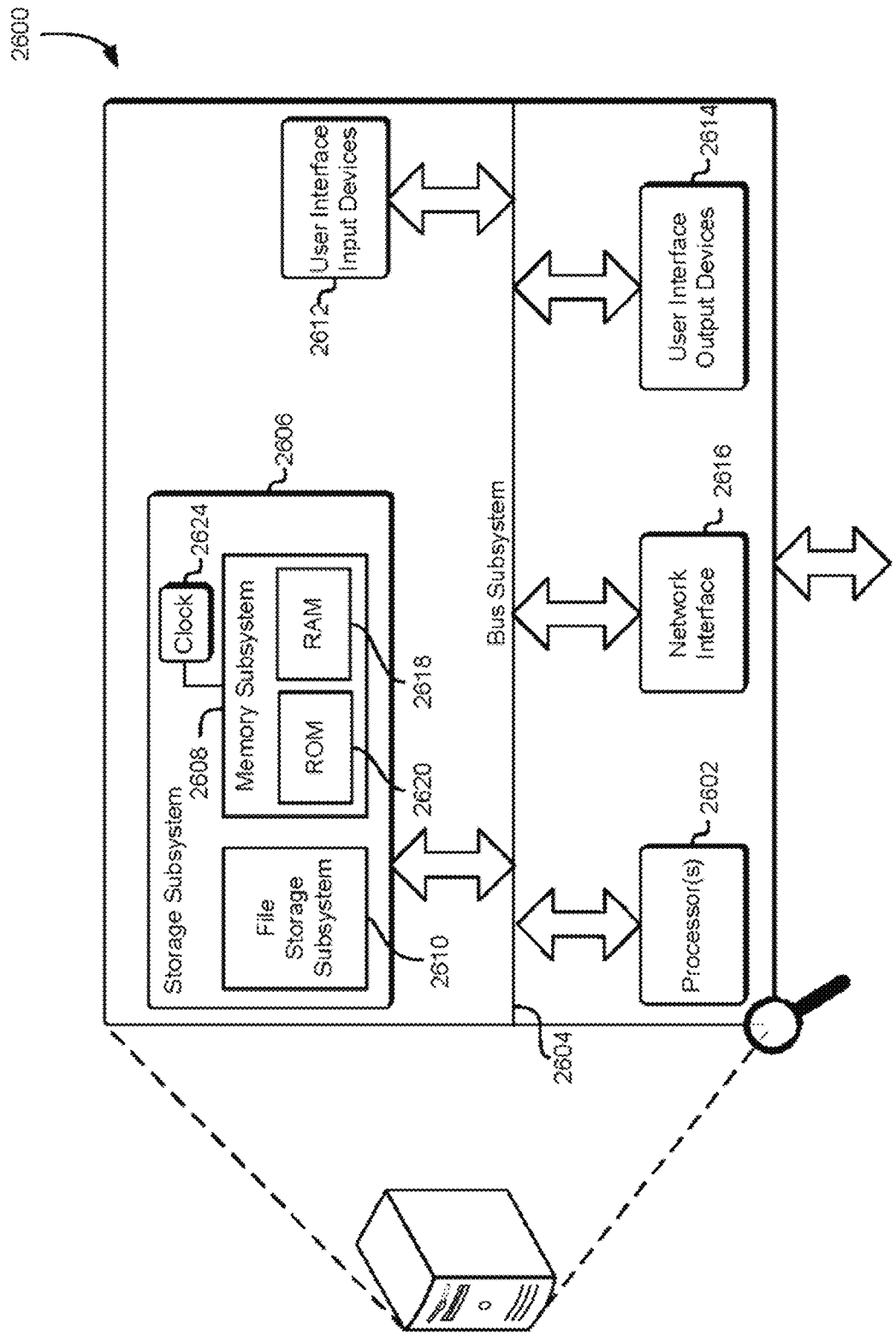
FIG. 7 is a schematic diagram illustrates a computing environment in which various embodiments can be implemented.

The disclosure relates generally to pseudo-random data generation, and more particularly to pseudo-random number generation. The disclosure is particularly suited, but not limited to, use in pseudo-random number generation for blockchain transactions.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

The global lottery industry is continuously growing, notably thanks to the development of the Internet and mobile devices applications.

The main issues concerning users, particularly in online platforms for lotteries, are related to the fairness and trust in the service provider. When an online lottery is constructed by a third party, a participant can neither be certain that the winning prize exists nor that there has been no manipulation of the lottery itself. In such a lottery, the user has no guarantee that the process used to select the winner is random and secure.

One possible solution to the first of these problems—the existence of the winning funds—is provided by the blockchain. If a lottery is constructed as a multi-party transaction on the blockchain, all participants can verify that the jackpot exists and the nature of the blockchain means that there will exist an immutable record of that fact on the distributed public ledger. This use of a blockchain also addresses some other issues, such as allowing for instantaneous redemption of winnings, unrestrictive participation across borders and the ability to monitor funds involved in the lottery.

It remains then to find a way to ensure the randomness and security with which a winner is selected in a blockchain-based lottery. It would be desirable to circumvent both core issues inherent in online lotteries by using the blockchain as the platform for such applications.

Among the most recent examples of blockchain-based lotteries it is worth mentioning Quanta, disclosed at K. Farris, S. Ormond-Smith, L. Hills, Quanta Whitepaper (2018). www.quantaplc.im/Quanta.pdf. which operates on the Ethereum blockchain, and TrueFlip, disclosed at N. Parkhomenko, K. Katsev, *TrueFlip Whitepaper* (2016). trueflip.io/TrueFlip%C2%A9%20Whitepaper.pdf?new. The randomness in the TrueFlip protocol is generated by using confirmed block hashes, which are incorporated into an (open-source) algorithm to generate the winning numbers.

Despite the presence of elements of decentralisation and transparency, such as the open-source code used for randomly generating the winning numbers, many processes are controlled by the entity who invented the TrueFlip protocol and involve numerous off-chain transactions.

In general, one of the main issues that is yet to be addressed is that of finding a reliable and verified source of entropy and a cryptographically-secure random number generator that are compatible with blockchain operations and script.

It is conceivable that a new opcode, such as the proposed 'OP_DETERMINISTICRANDOM', disclosed at P. Strateman, *New Opcodes* (2016. www.elementsproject.org/elements/opcodes/, could be used for generating random numbers in-script. These solutions, as presented currently, do not eliminate the problem but rather incentivise good behaviour and said incentive is adjustable.

However, putting aside the specific technical issues with these proposed solutions, all of them are fundamentally problematic in that they require the introduction of a new opcode into the existing Bitcoin script library. This is undesirable as it increases the attack-surface of the underlying blockchain, which undermines the justification for using it as a platform for lotteries and gaming altogether.

Thus, it is desirable to provide a method for generating random numbers, for use on the blockchain.

Such an improved solution has now been devised.

Thus, in accordance with the present disclosure there is provided a method as defined in the appended claims.

In accordance with the disclosure there may be provided a method of pseudo-randomly generating data, the method comprising:

receiving first data comprising at least one respective first data item from each of a plurality of first participants;

combining a plurality of said first data items to generate second data; and applying at least one one-way function to at least part of said second data to generate third data, wherein the or each said one-way function is adapted to receive input data and generate output data based on said input data, wherein said input data is not deducible from said output data and said one-way function.

By applying at least one one-way function to data from a plurality of first participants, this provides the advantage that the third data cannot be predicted by any of the first participants and is therefore pseudo-random. In the case of blockchain transactions, this provides the further advantage of enabling pseudo-random data/number generation without significant computational overhead.

Said first data may be received from said first participants in encrypted form.

This provides the advantage of improving security by providing secure communication.

The method may further comprise receiving fourth data comprising at least one respective fourth data item from each of a plurality of said first participants, wherein the or each said fourth data item is generated by applying at least one one-way function to the or each respective said first data item corresponding to said first participants.

This provides the advantage of enabling security to be improved by verifying that the first data item has not been altered.

The method may further comprise sending said fourth data to a plurality of said first participants.

This provides the advantage of enabling said first participants to independently check that said first data has not been altered.

At least one said one-way function may be a hash function.

At least one said one-way function may relate public and private keys of respective public-private key pairs of a cryptography system.

The cryptography system may be an elliptic curve cryptography system.

In the case of blockchain transactions, this provides the advantage of enabling hash functions available for other purposes to be easily used.

At least one said first data item may include at least part of a respective first digital signature.

This provides the advantage of enabling random integer generation by digital signature algorithms to be used, thereby also enabling randomness to be added to generation of said first data items, in addition to the randomness generated by the method defined above.

At least one said first data item may include at least part of a respective first digital signature based on a private key and an ephemeral key.

The method may further comprise receiving from each of a plurality of said first participants at least one respective second digital signature, wherein said second digital signature is signed with the same private key as the corresponding said first digital signature.

This provides the advantage of enabling verification to be carried out that both the first and second digital signatures have been signed using the same private key, thereby enabling verification that the first data has not been altered. Also, in the case of blockchain transactions, signature verification can easily be carried out using the digital signature algorithms in scripts.

The method may further comprise receiving fifth data comprising a respective fifth data item from each of a plurality of said first participants, wherein said fifth data item is part of the corresponding said first digital signature and said first digital signature is constructed by combining said fifth data item with the corresponding said first data item.

The method may further comprise sending said fifth data to a plurality of said first participants.

This provides the advantage of enabling each first participant to independently check that said first data item has not been altered.

At least one said fifth data item may include at least part of a respective first digital signature based on an ephemeral key.

This provides the advantage of being easily generated by a digital signature algorithm in blockchain script, and further improves security by adding further randomness to generation of the first data.

The method may further comprise sending said first data to a plurality of said first participants subsequently to generation of said third data.

This provides the advantage of enabling the mechanism for generating the third data to be verified.

The third data may form part of a blockchain transaction redeemable by means of a script containing said first data items.

This provides the advantage of automatically making said first data items public on the blockchain when the script is executed, thereby automatically making the process of generation of the third data verifiable.

Execution of said script may regenerate said third data from said first data items.

This provides the advantage of efficient verification of the process of generating the third data.

The third data may be generated by means of a plurality of said one-way functions.

This provides the advantage of improving security.

The third data may be generated by means of repeated application of at least one said one-way function.

This provides the advantage of improving security.

The third data may be generated by means of a plurality of second participants.

This provides the advantage of improving security, since a single honest second participant provides enough randomness to enable the process to be successfully carried out.

The method may further comprise selecting an item from a plurality of items on the basis of said third data.

Said selection may comprise selecting a public key of a public-private key pair of a cryptography system, wherein at least one said participant has access to the private key of said pair.

The disclosure also provides a system, comprising:
a processor; and
memory including executable instructions that, as a result of execution by the processor, causes the system to perform any embodiment of the computer-implemented method described herein.

The disclosure also provides a non-transitory computer-readable storage medium having stored thereon executable instructions that, as a result of being executed by a processor of a computer system, cause the computer system to at least perform an embodiment of the computer-implemented method described herein.

These and other aspects of the present disclosure will be apparent from and elucidated with reference to, the embodiment described herein. An embodiment of the present disclosure will now be described, by way of example only, and with reference to the accompany drawings, in which:

FIG. 1 is a Bitcoin script for pseudo-randomly generating a number using a method embodying the present disclosure;

FIG. 2 is an initiation transaction of a blockchain lottery embodying the present disclosure;

FIG. 3 is an oracle transaction of a blockchain lottery embodying the present disclosure;

FIG. 4 is an oracle transaction of a blockchain lottery of a further embodiment of the present disclosure;

FIG. 5 is a winnings-redemption transaction of a blockchain lottery embodying the present disclosure;

FIG. 6 is a Bitcoin script for redeeming the funds encumbered by the oracle transaction of FIG. 4; and FIG. 7 is a schematic diagram illustrates a computing environment in which various embodiments can be implemented.

Randomness on the Blockchain

It is desirable to conceive of a new method for incorporating random processes into the blockchain in order to allow gaming algorithms based on luck into the Bitcoin script. This means that the method presented should ensure the following properties of the random numbers that are to be generated and used in script:

(1) Unpredictable: the random number to be used in determining outcomes should not be predictable before funds are committed to a luck-based event.

(2) Deterministic: the random number(s) generated should be reproducible from the same inputs at all times after the initial generation.

(3) Verifiable: all nodes should be able to reproduce and verify the chosen random number such that all nodes agree on the number(s) that has been generated.

The method proposed in this application ensures all the above properties are upheld in the generation of random numbers on the Blockchain. The term "Bitcoin" is used herein to include all variations of protocols which derive from the Bitcoin protocol.

Fundamental Concepts

Pseudo-Random Number Generators

In general, random numbers fall into two categories: truly-random and pseudo-random. The distinction to be made is that true-randomness is very hard to achieve and is usually reliant on natural processes or electrical noise.

Alternatively, pseudo-randomness is achieved by using a single high-entropy seed value $V_{Seed}$ (truly-random) to initialise an algorithm for generating a sequence of pseudo-random numbers $N_k$, where k is the period of the random number generator $$V_{Seed} \rightarrow (N_1, N_2, \ldots, N_k).$$

For most practical applications pseudo-random number generators are used if their properties are suitable. In the case of randomness incorporated on the blockchain it is also required that the mechanism for pseudorandom number generation is cryptographically secure. This is referred to as a CSPRNG (cryptographically-secure pseudo-random number generator) by the usual definition.

In general, CSPRNGs are deterministic and hence produce a sequence of numbers verifiable by anybody who knows $V_{Seed}$. Such a generator would be suitable for the purposes of blockchain applications, except for two core issues.

Firstly, a lengthy algorithm would need to be incorporated from a known CSPRNG into Bitcoin scripting language, which would add computational overhead and limit the opportunity for functions of the random numbers generated by the algorithm.

In addition, there is still the problem of being able to provide a seed value $V_{Seed}$ that has entropy sufficient to be classed as truly-random. Currently, there exists neither a mechanism for producing such a seed in-script, nor to use an external seed as input to a redeem script in a way that fulfils the requirement (1) that the generated random number is unpredictable.

Hash Functions

The construction of a blockchain is contingent on the use of hash functions, and their inherent properties. In the case of Bitcoin transactions, a hash function H is defined as a one-way deterministic function that takes an arbitrary data structure X and outputs a 256-bit number $H(X) \in \mathbb{Z}_{256}$ $$Y = H(X), X \longmapsto H(X).$$

The fact that hash functions, such as SHA-256, behave as one-way random oracles should be appreciated. That is to say if a hash Y is computed from a pre-image X that is not known to a user, it is computationally difficult for the user to find X.

A property of hash functions is that the hashes of two 256-bit data structures, which differ in the value of a single bit only, can be treated as completely unrelated. In other words, a hash value behaves as a true random number with respect to the user, so long as that user does not know the pre-image in its entirety.

This means that it is possible to simply take a hash value Y—or some function of it—and treat it as the single random number R intended to be produced, under the assumption that no single party has control over the entire input pre-image X $$R:=R \text{ and}:=Y=H(X); \text{for unknown } X.$$

By extension, a random number sequence $S_R$, of (k+1)— random values, may be generated by repeated hashing of an initial random number $R_0$ using the same arguments $$R_0=H(X_0); R_1=H(R_0); R_k=H(R_{k-1}),$$

$$S_R=(R_0, R_1, \ldots, R_k).$$

It should also be noted that, because hash functions are deterministic, any party may reproduce the entire sequence $S_R$ with knowledge only of the specific hash function used and the initial pre-image $X_0$, which hereby acts as a seed.

If this initial pre-image is made public at the time when the random sequence is generated, any node may independently verify that the sequence corresponds to this pre-image. It is clear then that hash functions may be used to generate random-number sequences to be used in-script that satisfy the above criteria (1) and (2), provided only that no single party involved in generating the random number(s) can manipulate the entire initial pre-image $X_0$.

Alternative One-Way Functions

In general, the term 'hash function' is used in the present application to refer to a specific type of a one-way function, within a broader class of functions, because hash functions have existing op_codes in Bitcoin script. However, it is conceivable that alternative one-way functions can be used in place of any instance of a hash function herein. Two examples include 1. Elliptic Curve (EC) point multiplication—the function $E(x)=x \cdot G$ that is used to generate an EC public key from a private key, where G is the elliptic curve base point and '·' is the EC point multiplication operator. This is a one-way function as it is easy to compute $E(x)$ given x, G but computationally difficult to determine x given $E(x)$, G.
2. The Rabin function—the function $R(x)=x^2 \mod N$, where N=pq for p, q both prime. It is easy to find the square $R(x)$ modulo N, while finding square roots $\pm x$ given $R(x)$, N is as difficult as factoring N to find p, q, which is computationally hard.

Digital Signatures

Consider a player, Alice, who wishes to create a digital signature for a message hash H(m) using her private key $S_A$. Alice has a public key $P_A$ associated with her private key according to ECC (Elliptic curve cryptography, using the elliptic curve as defined by the secp256k1 standard), where G is the elliptic curve base point of order n $$P_A=S_A \cdot G.$$

There are two components of the digital signature that need to be created: r and s. Alice generates an ephemeral key as a random number $k \in \mathbb{Z}_m^*$ and uses this to derive part r of the signature as $$(R_x, R_y)=k \cdot G,$$

$$r=R_x.$$

The part s of the signature is then derived from this in combination with Alice's private key, her hashed message and the ephemeral key as $$s=k^{-1}(H(m)+S_A*r) \mod n.$$

By concatenating r and s a data structure known as the ECDSA digital signature of the message hash is created $$\text{Sig } P_A=(r,s).$$

Given separately the values r and s, the full signature may be constructed in bitcoin script using the operator OP_CAT. When the signature is reconstructed it must be of the standard DER (Distinguished Encoding Rules—disclosed at S. Blake-Wilson, D. Brown, P. Lambert, *Use of Elliptic Curve Cryptography* (*ECC*) *Algorithms in Cryptographic Message Syntax* (*CMS*), Network Working Group (2002) tools.ietf org/html/rfc3278) format [Appendix 5.1] to be used in bitcoin script. This point becomes important when using the signature method discussed below for generating random numbers.

Method

There are three variations of the general method proposed for generating a random number using the blockchain. Each method involves multiple parties who join to create the random number.

The first method uses a combination of hash pre-images to produce a secure random number, while the second uses a combination of the s-components from several signatures. Finally, a hybrid of the two methods is proposed.

In each case, it is intended to produce a secure random integer $R_N \in \{0, N-1\}$.

The Hash Method

Consider N first participants in the form of being players, each of whom makes public their own hash value $Y_i=H(X_i)$, where it is stipulated that each player chooses a first data item in the form of their own secret pre-image $X_i$. The properties of hash functions allow it to be assumed that no player can guess another's pre-image given knowledge of the public hash value.

The players then send their secret pre-image $X_i$ to a second participant in the form of an oracle (the method generalises to both types of oracle; blind or otherwise). This could be done, for example, via a secret value distribution technique as outlined in International Patent Application WO 2017/145016, but any method of providing a secure channel or mechanism for communicating the pre-image to the oracle can be used.

The oracle then produces a random number $R_N$ via the following method.

1. The Oracle Verifies that $Y_i=H(X_i)$ for the Pre-Image Provided by Each Player.

It should be recalled that the hash values have already been made public prior to the pre-images being sent to the oracle. This ensures that the oracle is fed the correct pre-images as supplied originally by each player. On the blockchain these public values are immutable, and thus cannot be changed by a player after sending the pre-image.

This verification step ensures that the oracle will not proceed in generating a random number until all players have supplied it with their chosen secret pre-image.

2. The Oracle Computes $R_N$ as $$R_N = H\left(\sum_i X_i\right) \mod N$$

It should be recalled from above that $R_N$ is a random number with respect to each and every player provided only that no player knows all N of the original pre-image values $X_i$. In the present method all the pre-images are kept secret by the players and are communicated securely to the oracle.

This means that there is no way a malicious party may know all these inputs unless they control all players involved. In this case the adversary would trivially be manipulating a random number to be used by itself only.

In all other scenarios, where there is a minimum of one genuine player, the described properties of hash functions mean that they cannot manipulate $R_N$ in an advantageous way. This is true even when the adversary controls all N−1 other players. There is therefore no way for any party(s) to influence the random number generated by this method that can adversely affect another party. It should be noted that an additive '+' summation of the preimages $X_i$ has been used in the present case, as this is simple to implement in Bitcoin script, but it is possible to use a different operator, such as concatenation, in series analogous to the summation above.

There is now a random number $R_N$ generated in way that is both (1) unpredictable to any party involved in the process and (2) reproducible via a deterministic process. It will be shown below that the final requirement set out above, that the random number is (3) verifiable, is also met. An extension is that a random number sequence may also be generated by the oracle by repeated hashing of $R_N$.

The Signature Method

Now consider first participants in the form of N players each of whom makes public a signature Sig $P_i$ as well as a random value $r_i'$ that forms part of a second signature Sig $P_i'$ whose s'-component is kept secret.

$$\text{Sig } P_i = (r_i, s_i)$$

$$\text{Sig } P_i' = (r_i', s_i').$$

It is crucial that both signatures are signed (by means of the same ECDSA standard mentioned above) using the same private key $S_i$ such that it can be verified that both signatures correspond to the same owner of a public key $P_i$ $$P_i = S_i \cdot G.$$

The players then send first data items in the form of their secret $s_i'$ values to a second participant in the forms of an oracle, again done via a secret-sharing method, for example as outlined in International Patent Application WO 2017/145016, or otherwise securely. The oracle then produces a random number $R_N$ via the following method.

1. The Oracle Constructs Sig $P_i'$ and Verifies that it Corresponds to the Same Entity as Sig $P_i$ for Each Player.

This second signature is constructed by concatenating the public $r_i'$ value with the secret $s_i'$ value using the DER standard as shown in Appendix 1. The oracle then applies the standard ECDSA signature verification algorithm to both signatures and confirms that they were commonly signed by the owner of the public key $P_i$. This ensures that another party cannot influence the random number by providing their own signature for a given $r_i'$ value.

2. The Oracle Computes $R_N$ as $$R_N = H\left(\sum_i s_i'\right) \bmod N$$

The oracle generates second data in the form of the sum of the first data items and then generates third data in the form of the hash of the second data. This inherits the same properties outlined in the hash method described above due to the analogy of one-way hash functions with the one-way process of generating a public key from a private key in ECC.

If the replacements $Y_i \to P_i$ and $X_i \to s_i'$ are made, the analogy is clear, and the comments presented in step 2 of the hash method described above also apply to in the present case.

A random number $R_N$ has now been generated, as with the hash method described above, in a way that is both unpredictable to any party involved and verifiable, satisfying criteria (1) and (2) outlined above.

It should be made clear that the signature method and the hash method are directly analogous to one another and share core properties of their respective methods for random number generation. In particular, both methods require each user to be responsible for generating a secret value; $X_i$ and $s_i'$ for the hash and signature methods respectively. A further advantage of using the signature method here is that the act of choosing the secret is already standardised under the ECDSA procedure, while choosing an arbitrary hash preimage is not.

In the signature method, a way to directly verify the secret value $s_i'$ sent to the oracle has been provided by the original proposer of the corresponding public value $r_i'$ by comparison with the primary signature Sig $P_i = (r_i, s_i)$ that accompanied it. This verification is only an implicit one in the hash method.

Calculating $R_N$ In-Script

In both regimes the random number $R_N$ has fulfilled the requirements outlined above of being both (1) unpredictable and (2) deterministic. It is described in detail below how the methods of the present disclosure satisfy the third criterion that the random number is (3) verifiable.

This means that there needs to be a way for all network peers to independently verify that $R_N$ has been generated in the correct way. This is achieved by demanding that $R_N$ itself be calculated and used in the locking script of a transaction. In this way all the previously-secret $s_i'$ values are published on the blockchain as part of this script, meaning that anybody can verify the random number by constructing the input pre-image of a hash function $\Sigma_i s_i'$. A script of the following form is proposed to be used for generating the desired random integer $R_N \in \{0, N-1\}$ $$\langle R_N \rangle = \langle s_1' \rangle \langle s_2' \rangle \ldots \langle s_N' \rangle \text{OP\_ADD} \ldots$$
$$\text{OP\_ADD OP\_HASH256} \langle N \rangle \text{OP\_MOD},$$

where there are N−1 uses of the operator 'OP_ADD' and N secret values.

In the applications presented in this application $\langle R_N \rangle$ will be used to refer to this script. Note that this script can be used for generalised secret values including hash pre-images, partial signatures and combinations of these. FIG. 1 shows how this script is used to generate a random number.

The full redeem script for a transaction can include the verification that each pre-image corresponds to the correct committed hash, that each secret signature component combines with the public component to form the expected signature and that each supplied value has come from the correct player [Appendix 2].

A Combined Method

The methods presented so far are robust to malicious parties attempting to influence the outcome of the random number produced. However, there are many ways in which the hash method and signature method may be extended and combined in order to improve the security and unpredictability of the random number(s) generated.

The simplest combination of the two methods would be for each player to publish a hash value $Y_i$ as well as a signature Sig $P_i$, random value $r_i'$ and their public key $P_i$. The oracle may then produce a random value as $$R_N = H\left(\sum_i X_i + s_i'\right) \bmod N$$

where each player has also privately computed a secondary signature Sig $P_i'=(r_i',s_i')$. The "+" operator can be addition or concatenation for all summations in the present application. It should also be noted that the addition or concatenation operator '+' here could be replaced in another implementation by another operator, such as an XOR. If it is instead desired to extend one of the two methods individually, it is possible to impose that multiple oracles are invoked and players each provide multiple hash values $Y_i$ or secondary $r_i'$ values. For instance, if two oracles were to be invoked using the hash method, the random number $R_N$ may be calculated as $$R_N = H\left(\sum_i X_{i,1} + \sum_i X_{i,2}\right) \bmod N$$

where the first oracle sends the sum of one set of pre-images $X_{i,1}$ to the second, who adds this to the sum of a second set of pre-images $X_{i,2}$ and computes the random number. By invoking a number of oracles, the risk of an oracle being somehow corrupted by a malicious user is eliminated. Extending this to a large number of oracles reduces the risk of all oracles colluding, at the expense of greater computational and temporal overheads. It should be noted that these methods ensure that only a single oracle needs to be genuine for the random number to be generated securely and unpredictably.

Applications

Use-cases are described for the method of random number-generation described in the present application. The first application is in the context of a blockchain lottery involving N players, considered both in scenarios with and without a party who acts as a 'house'. The second application is for an N-sided game of Satoshi dice, whereby a player participates in a simple game of luck with a house. More general uses for generating random numbers using the blockchain are considered.

Lotteries

Consider a group of N players with associated public keys $P_i$, $\forall i \in \{1, N\}$. A lottery involving these players is constructed, where the winning funds will be locked to the owner of the randomly selected public key $P_W$.

The structure of the lottery comprises three transactions (i) An initiation transaction (ii) An oracle transaction (iii) A winnings-redemption transaction and will invoke one oracle for the secure generation of a random number that is used to lock the winning funds to $P_W$.

In such a lottery, it is ensured that each player has an equal chance of winning N×x Bitcoin with probability 1/N, where x is the initial buy-in value for a lottery ticket. The case is also considered separately where a 'house' is included as part of the lottery, who may recoup the lottery funds if the winning party does not claim their prize. In this case, each player has a chance of winning r+(N×x) Bitcoin with probability 1/(N+1), where r is the buy-in contribution of the house.

Initiation Transaction

1. Each player contributes a common value of x Bitcoin to an initiation transaction as their buy-in for a blockchain lottery ticket. This transaction will comprise N inputs and 1 output and represents the digital point of sale of the blockchain lottery ticket for all participants.

2. In addition to the buy-in, each player also includes as input a public value, residing in a standard OP_DROP statement. This value will depend on the random number-generation method to be used.

For this implementation, the signature method is used and thus the value supplied is a random value $r_i'$, which forms a signature Sig $P_i'=(r_i',s_i')$ whose $s_i'$—component is kept secret.

3. Finally, each player provides their public key $P_i$ and a signature Sig $P_i=(r_i,s_i)$ corresponding to it. This is done for all players until the transaction contains sufficient inputs to produce a single N×x output. This output is paid to the public key corresponding to the oracle $P_O$.

The structure of the initiation transaction is shown in FIG. 2.

Oracle Transaction

1. Each player sends their secret $s_i'$ to the oracle.

The oracle will be decided upon before even the initiation transaction occurred. It may be a trusted third party, a purpose-built TEE (trusted execution environment—a piece of hardware purpose-built to execute known code for a specific function or some other form of oracle).

2. The oracle checks that each secondary signature Sig $P_i'=(r_i',s_i')$ and each primary signature Sig $P_i=(r_i,s_i)$ correspond to the same key-pair associated with public key $P_i$.

3. The oracle constructs a transaction. This transaction uses the UTXO of the initiation transaction as its only input and locks the entire N×x Bitcoin funds to a single winning public key. The winning key $P_W$ is selected at random using the random number $R_N$ that is generated within the locking script of this oracle transaction.

The output script of FIG. 3, which is shown below and also denoted by $<P_W>$, is used to randomly select the winning public key from the set of N participating keys $P_i$. It is seeded by the earlier script $<R_N>$, which calculates in-situ the random number that picks the winning key $<P_W>=<P_1><P_2> \ldots <P_N><R_N>$OP_ROLL
 OP_TOALTSTACK OP_DROP . . . OP_DROP
 OP_FROMALTSTACK, where there are N−1 uses of the operator 'OP_DROP' and N public keys.

In the first two lines of the locking script the set of participating public keys is manipulated according to the value produced by the $<R_N>$ part of the script. The script then simply requires the signature Sig $P_W$. The locking script of the oracle transaction simply encumbers the winning funds to be signed for by the owner of the winning public key $P_W$. It should be noted that the order in which the public keys appear in this locking script must be consistent with the order in which they appear in the initiation transaction, otherwise the oracle can manipulate the outcome by reordering the public keys.

Lottery with a House

In this application an N-player lottery has been constructed in which there is no party who acts as a 'house'. It may be desirable to extend this concept to such a lottery to ensure that funds are not simply lost and wasted in the Bitcoin ecosystem. For instance, if one party wishes to construct a lottery and offers act as the house by taking on the overheads involved, such as setting up a user-interface, instantiating an oracle or sourcing participants they may wish to be incentivised for doing so. This incentive could be in the form of a timeout mechanism, which would send the winning funds of the lottery to the house. Implementing this lottery would involve N-players contributing x Bitcoin and a house contributing r Bitcoin. The house would be able to recoup the entire lottery funds and pay to their public key $P_H$ after some agreed timeout period $\Delta T_E$ has elapsed if the oracle transaction were modified to take the form set out in FIG. 4.

In the oracle transaction of FIG. 4, the locking script has been modified to include the timeout failsafe, which will allow the party acting as the house to spend the lottery funds if the winning party does not claim their prize before the agreed time. The portion of the locking script highlighted in blue allows this to happen. In this type of blockchain lottery that includes a house, each player has a chance of winning $r+(N\times x)$ Bitcoin with probability $1/(N+1)$, where r is the buy-in contribution of the house. This concept of adding a house to a lottery can be extended to a lottery where there is not necessarily a winner, such as national lotteries of various countries, by including a set of public keys that correspond to the house. In the case that one of these keys is selected the lottery rolls over.

Winnings-Redemption

Once the oracle transaction is recorded on the blockchain the owner of the winning public key $P_W$ may spend the winning funds. A valid transaction of this type is shown in FIG. 5.

The unlocking script of this transaction comprises the signature Sig $P_W$ corresponding to the winning public key. When unlocking the funds encumbered by the oracle transaction, this input to the redemption transaction (scriptSig) will be run alongside the locking script (scriptPubKey) of the previous oracle-constructed transaction. The combination of these two pieces of script is shown in the FIG. 6, demonstrating that the winning player can spend the N×x Bitcoin winning funds simply by providing the signature corresponding to the winning public key $P_W$.

N-Sided Satoshi Dice

A second application of the methods of the present application is a game comprising a dealer and one player. This game is equivalent to the player guessing correctly the outcome of rolling an N-sided die. It is clear that this game is simply a two-party case of the general blockchain lottery application as outlined above. Here, one party acts as the dealer and the other acts as the player.

In this scenario, the following procedure describes how the game is to be played 1. The player makes their guess $c \in \{0, N-1\}$. This guess is calculated as $$c = H(X_P) \bmod N$$

2. An initiation transaction commits $Y_P = H(X_P)$ from the player and $Y_D = H(X_D)$ whose pre-images will be the input parameters to determine the outcome of a trial T that represents an N-sided Satoshi die being thrown. This transaction is paid to an oracle and includes both the amount x Bitcoin to be wagered by the player and the winning returns R Bitcoin to be wagered by the dealer.

3. The preimages $X_P$ and $X_D$ are sent to the oracle using a secret value distribution technique such as is outlined in International Patent Application WO 2017/145016. The oracle then constructs a transaction that locks the game funds to the winning public key $P_W$.

This is done in the same way as in the general lottery case, but with only one public key P belonging to the player and N−1 public keys $D_i \forall i \in \{1, N-1\}$ belonging to the dealer. The outcome of rolling the Satoshi die T is calculated in the locking script and is given by $$T = H(X_P + X_D) \bmod N.$$

4. If c=T the player can redeem the winning funds x+R Bitcoin by spending the output of the oracle transaction. Otherwise the winning funds are redeemable by the dealer.

By the discussion presented earlier in the present application, a random number $R_N := T$ has been successfully generated, which satisfies the criteria (1)-(3), and has been used to determine the outcome of a game of luck. It should be noted that the hash method described above may lend itself better to this application as it allows a guess to be tailored to the player's preference more easily.

On average, a player may compute the hash of at most N arbitrary pre-images $X_P$ before arriving at his desired guess value, which can then be committed to the game. A game of luck set up in this way gives a player a 1/N chance of winning x+R Bitcoin, where the associated gain R may be a function of x.

Seeding Other Generators

It has been shown above how random numbers can be generated in-script and securely using the Bitcoin blockchain protocol. In the lottery applications presented, it has been proposed to use these random numbers for a function immediately in a transaction rather than to use them elsewhere i.e. for some off-chain purpose.

The methods described in the present application generalise to the simplest case of generating a random number through a secure, consensus-based and transparent protocol. For instance, if a single party or an organisation wish to produce a random number to seed an off-chain process they may use one or more of the methods presented in this paper to do so. The party would simply proceed by constructing a transaction flow similar to the one used for the lottery application but without associating significant funds to the global inputs and outputs of the process. In this way the party may use the blockchain to produce a random number $R_N$ or sequence $S_R$ in such a way that the mechanism, seed (i.e. The linear combination of secret values $s_i'$) and result are all transparently recorded on the blockchain public ledger.

Turning now to FIG. 7, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data.

The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

TABLE 1

| DER encoding of Signature (s, r) | | | |
|---|---|---|---|
| Sequence identifier | 1 | 30 | |
| Length of sequence | 1 | 46 | |
| Integer identifier | 1 | | 02 |
| Byte-length of integer | 1 | — | 21 — |
| Indicates the leading byte is non-zero | 1 | — | 00 — |
| R | 32 | — | e9d34347e597e8b335745c6f8353580 f4cdb4bcde2794ef7aab915d996642c7 |
| Integer identifier | 1 | | 02 |
| Byte-length of integer | 1 | | 21 |
| Indicates the leading byte is non-zero | 1 | | 00 |
| S | 32 | | df2ccb5c2c7243c55bde34934bd55efbd ac21c74a20bb7b438d1b6de3311f |
| Sighash type | 1 | | 01 |

2. Verification Scripts i. Preimage Verification

The following script can be used to verify that each of the supplied preimages $X_i$ correspond to the correct pre-committed hash values $Y_i$ as an in-script process. <Verify 1>=<$Y_1$><$X_1$>OP_SHA256   OP_EQUAL   . . . <$Y_N$><$X_N$>OP_SHA256 OP_EQUAL ii. Signature Verification The following script can be used to verify that each of the supplied secondary signatures Sig $P_i'$ and the initial signatures Sig $P_i$ both correspond to the public key $P_i$, again as an in-script process.

```
<Verify    2>=<P₁>OP_DUP<Sig    P₁>OP_SWAP
OP_CHECKSIG<s₁'><r₁'>OP_CAT              OP_SWAP
OP_CHECKSIG  . . .  <P₁>OP_DUP<Sig P_N>OP_SWAP
OP_CHECKSIG<s_N'><r_N'>OP_CAT            OP_SWAP
OP_CHECKSIG
```

Documents that may be relevant to this disclosure include K. Farris, S. Ormond-Smith, L. Hills, Quanta Whitepaper (2018). www.quantaplc.im/Quanta.pdf, N. Parkhomenko, K. Katsev, TrueFlip Whitepaper (2016).trueflip.io/TrueFlip%C2%A9%20Whitepaper.pdf?new, P. Strateman, New Opcodes (2016. www.elementsproject.org/elements/opcodes/, International Patent Application WO 2017/145016, S. Blake-Wilson, D. Brown, P. Lambert, Use of Elliptic Curve Cryptography (ECC) Algorithms in Cryptographic Message Syntax (CMS), Network Working Group (2002). tools.ietf.org/html/rfc3278.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of pseudo-randomly generating data, the method comprising:
receiving first data comprising at least one respective first data item from each of a plurality of first participants;
combining a plurality of said first data items to generate second data, the plurality of said first data items comprising one first data item from each of the plurality of first participants; and
applying at least one one-way function to at least part of said second data to generate third data,
wherein each of the at least one one-way function is adapted to receive input data and generate output data based on said input data, wherein said input data is not deducible from said output data and said one-way function;
wherein the at least one said first data item includes at least part of a respective first digital signature;
the method further comprising receiving fifth data comprising a respective fifth data item from each of the plurality of said first participants, wherein said fifth data item is part of the corresponding said first digital signature and said first digital signature is constructed by combining said fifth data item with the corresponding said first data item.

2. The method of claim 1, wherein said first data is received from said first participants in encrypted form.

3. The method of claim 1, further comprising receiving fourth data comprising at least one respective fourth data item from each of the plurality of said first participants, wherein each of the fourth data item is generated by applying at least one one-way function to each of the respective said first data item corresponding to said first participants.

4. The method of claim 3, further comprising sending said fourth data to a plurality of said first participants.

5. The method of claim 1, wherein the at least one said one-way function is a hash function.

6. The method of claim 1, wherein the at least one said one-way function relates public and private keys of respective public-private key pairs of a cryptography system.

7. The method of claim 6, wherein the cryptography system is an elliptic curve cryptography system.

8. The method of claim 1, wherein the at least one said first data item includes the at least part of the respective first digital signature, wherein said part is based on a private key and an ephemeral key.

9. The method of claim 1, further comprising receiving from each of the plurality of said first participants at least one respective second digital signature, wherein said second digital signature is signed with the same private key as the corresponding said first digital signature.

10. The method of claim 1, further comprising sending said fifth data to the plurality of said first participants.

11. The method of claim 1, wherein the at least one said fifth data item includes at least part of a respective first digital signature based on an ephemeral key.

12. The method of claim 1, further comprising sending said first data to the plurality of said first participants subsequently to generation of said third data.

13. The method of claim 12, wherein the third data forms part of a blockchain transaction redeemable by means of a script containing said first data items.

14. The method of claim 13, wherein execution of said script regenerates said third data from said first data items.

15. The method of claim 1, wherein at least one of the third data is generated by means of a plurality of said one-way functions, the third data is generated by means of repeated application of at least one said one-way function, or the third data is generated by means of a plurality of second participants.

16. The method of claim 1, further comprising selecting an item from a plurality of items on the basis of said third data.

17. The method of claim 16, wherein said selection comprises selecting a public key of a public-private key pair of a cryptography system, wherein at least one said participant has access to the private key of said pair.

18. A computer-implemented system comprising:
a processor; and memory including executable instructions that, as a result of execution by the processor, causes the system to perform the steps of:
receiving first data comprising at least one respective first data item from each of a plurality of first participants;
combining a plurality of said first data items to generate second data, the plurality of said first data items comprising one first data item from each of the plurality of first participants; and
applying at least one one-way function to at least part of said second data to generate third data, wherein each of the at least one one-way function is adapted to receive input data and generate output data based on said input data, wherein said input data is not deducible from said output data and said one-way function;
wherein the at least one said first data item includes at least part of a respective first digital signature;

the method further comprising receiving fifth data comprising a respective fifth data item from each of the plurality of said first participants, wherein said fifth data item is part of the corresponding said first digital signature and said first digital signature is constructed by combining said fifth data item with the corresponding said first data item.

\* \* \* \* \*